Aug. 21, 1945.  A. L. PROUT  2,383,214
WELL CASING EXPANDER
Filed May 18, 1943
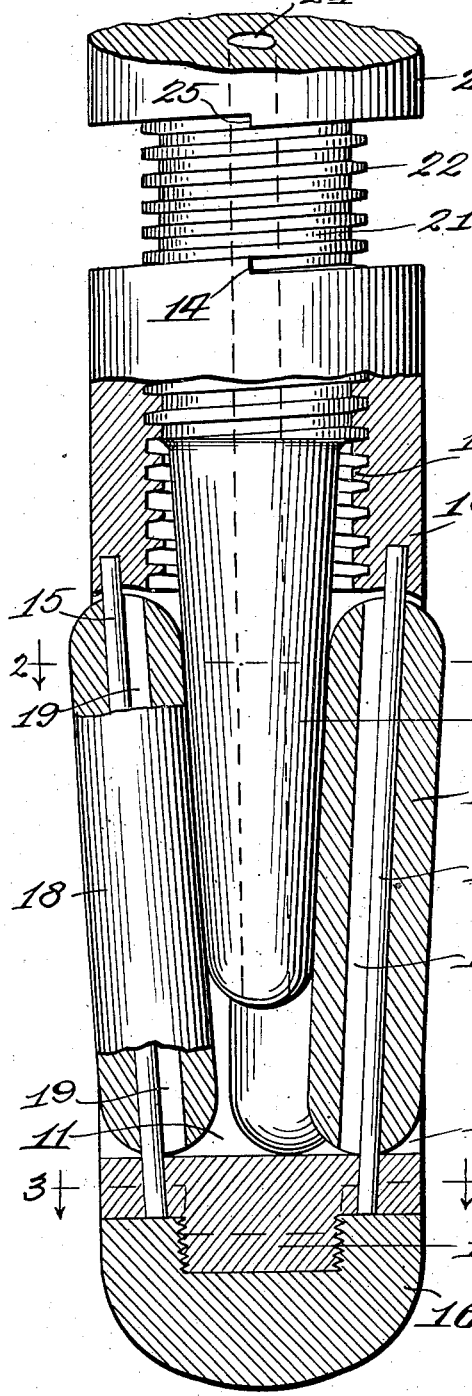
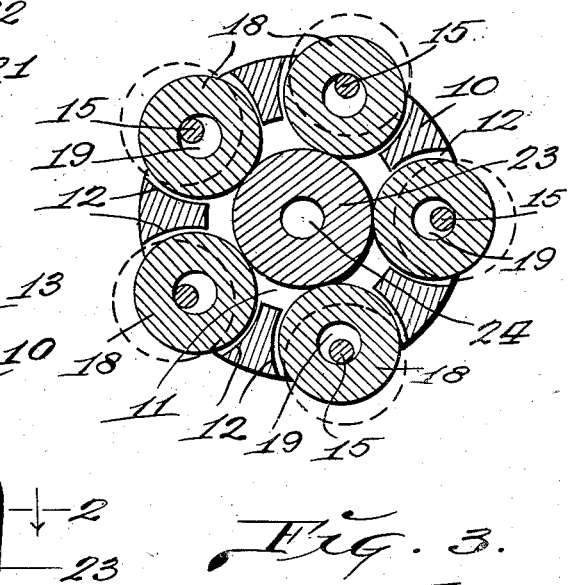
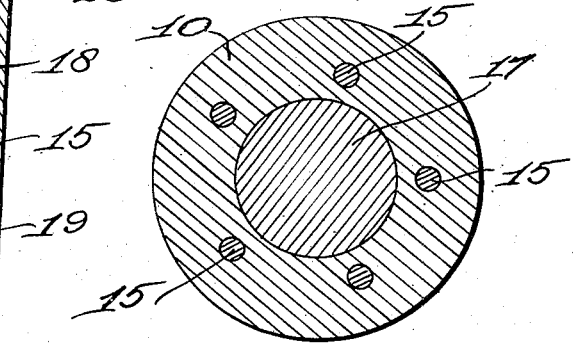
INVENTOR.
ARTHUR L. PROUT.
BY
Martin P. Smith
ATTY.

Patented Aug. 21, 1945

2,383,214

UNITED STATES PATENT OFFICE 2,383,214

WELL CASING EXPANDER

Arthur L. Prout, Long Beach, Calif., assignor of one-half to Bessie Pugsley, Long Beach, and one-half to Mary A. Campbell, Los Angeles, Calif.

Application May 18, 1943, Serial No. 487,467

3 Claims. (Cl. 153—82)

My invention relates to a tool particularly designed for expanding dented, collapsed or partially collapsed well casing, pipes, tubes and the like and has, for its principal object, to provide a simple, sturdy and practical tool which is adapted to be run into well casing or the like and rotated so as to roll out dents and partially collapsed portions, in order to restore the casing to its original shape and diameter, and said tool also being effective in rolling out blisters and for breaking up any rust or corrosion accumulations on the inner surfaces of the casing or pipe.

A further object of my invention is to provide a tool of the character referred to, having a series of casing engaging rollers which are expanded and forced with pressure against the inner surface of the casing by means of a tapered member, so as to practically iron out irregularities in the casing wall and which rollers are capable of retractile movement at the termination of their expansive function, thus enabling the tool to be readily withdrawn from the pipe or casing after the latter has been restored to its original shape.

A further object of my invention is to provide a casing expander which will automatically lock the rollers against retractile movement after they have been expanded so as to act on tubes or casings having standard internal diameters, thus overcoming any possibility of expanding tubes or casing beyond their fixed diameters.

A further object of my invention is to greatly improve upon and simplify the construction of the tube and casing tool forming the subject matter of U. S. Letters Patent #1,594,114 issued to me July 27, 1926, also Pat. #1,615,306 issued to David G. Lorraine Jan. 25, 1927.

With the foregoing and other objects in view, my invention consists in certain novel features of construction and arrangement of parts which will be hereinafter more fully described and claimed and illustrated in the accompanying drawing in which:

Fig. 1 is an elevational view of my improved casing expander with parts thereof in longitudinal section.

Fig. 2 is cross section taken on the line 2—2 of Fig. 1.

Fig. 3 is a cross section taken on the line 3—3 of Fig. 1.

Referring by numerals to the accompanying drawing which illustrates a preferred embodiment of my invention, 10 designates the body of the tool which is preferably cylindrical in shape and provided with an axial chamber 11 and with longitudinally disposed circumferentially spaced pockets or slots 12 between the chamber and outer face of said body.

Formed in the upper portion of body 10 between the upper end of chamber 11 and the top of said body is a threaded bore 13 and formed on the upper end of said body are one or more radially disposed shoulders 14.

Seated in body 10 above and below the pockets 12 are the ends of fixed spindles 15, which are inclined slightly with respect to the axis of the tool and arranged so that their lower ends are closer to said axis than their upper ends.

A cap or "bullnose" 16 is screw-seated on a threaded lug 17 on the lower end of body 10, thus covering the lower ends of the spindles and preventing same from becoming detached from said body.

Cylindrical rollers 18 having tapered or rounded ends are located in the pockets 12, each roller being provided with an axial bore 19 for the corresponding spindle and the diameter of these bores is somewhat greater than that of the spindles, thus enabling the rollers to move for an appreciable distance radially with respect to the body 10.

A cylindrical member 20, having a diameter similar to that of body 10, is attached to and depends from a drill string or the like and depending from said member is a body 21 having an external thread 22 which engages the thread 13 in body 10.

Depending from the threaded body 21 is a mandrel 23 which gradually tapers toward its lower end and this mandrel is positioned and operates between the rollers 18.

Formed through member 20, body 21 and mandrel 23 is an axial duct 24, the upper end of which communicates with the lower end of the circulation fluid flow duct through the drill string and thus the circulation fluid may discharge from the lower end of the mandrel into chamber 11 and flow outwardly through the pockets 12 around the rollers 18 therein, thus washing away dirt sediment, sand or the like and at the same time lubricating and cooling the rollers.

The fluid circulated through the tool may be air or gas or liquids such as water, oil or a liquid cleanser.

Formed on the underface of member 20 around the body 21 are radially disposed shoulders 25 which engage the shoulders 14 on top of body 10 when the threaded body 21 is screwed downwardly to its limit in body 10 and under such conditions, said body 10 is locked to and rotates with member 20 and the drill string.

The tool carried at the lower end of said drill string may be run into a string of casing in a well hole for the purpose of expanding collapsed portions of said casing, for rolling out dents and for breaking up accumulations of rust and corrosion. As the mandrel is screwed downwardly into body 10, the rollers will be forcibly moved radially outward to bear on the inner face of the casing and as the shoulders 25 engage shoulders 14, body 10 will be caused to rotate with the drill string so that the rollers 18 carried by said body, will act with pressure against the casing to restore same to its normal circular shape and diameter.

By partially unscrewing the mandrel from body 10, outward pressure on the rollers 18 is relieved, thus enabling the tool to be readily withdrawn from the casing.

Obviously the tools may be made in various sizes so as to be used in tubes or casing having fixed or standard internal diameters. With suitable supporting and driving means the tool may be used for expanding and acting upon tubes or casing sections which occupy substantially horizontal positions on a casing rack.

Where casing is collapsed to a practically flat condition, it is advisable and highly advantageous to first use one of the expanding tools constructed in accordance with the hereinbefore mentioned patents, to be followed by the use of my improved tool for restoring the casing to the proper diameter and cross sectional form.

Thus it will be seen that I have provided a well casing expander which is simple in structure, inexpensive of manufacture and very effective in performing the functions for which it is intended.

It will be understood that minor changes in the size, form and construction of the various parts of my improved casing expander may be made and substituted for those herein shown and described without departing from the spirit of the invention, the scope of which is set forth in the appended claims.

I claim as my invention:

1. A tube or casing expander comprising a cylindrical body having an axial chamber, the wall of said body surrounding the lower portion of said chamber being slotted lengthwise to form a plurality of pockets, the inner surface of the wall above said pockets being threaded, inclined rods extending lengthwise through said pockets, rollers mounted for rotary and radial movement upon said rods, a mandrel having a threaded upper portion which engages the thread in the upper portion of the chamber in said body, the lower portion of which mandrel is tapered and engages said rollers and said mandrel having a fluid circulation duct communicating with the pockets in said body.

2. The tube or casing expander as set forth in claim 1 including cooperating shoulders on said body and mandrel for limiting the movement of said mandrel into said body.

3. The tube or casing expander as set forth in claim 1, including a cap removably positioned on the lower end of said body for retaining the rods therein.

ARTHUR L. PROUT.